United States Patent
Kitapini et al.

(10) Patent No.: US 7,522,986 B2
(45) Date of Patent: Apr. 21, 2009

(54) RIDE CONTROL SYSTEM FOR ARTICULATED VEHICLES

(76) Inventors: N'ton Kitapini, 4461 Harvard Rd., Detroit, MI (US) 48224; Diallo Kitoko Kitapini, 11945 Michel Sarrazin, Montreal, QC (CA) H4J 2G6

( * ) Notice: Subject to any disclaimer, the term of this patent is extended or adjusted under 35 U.S.C. 154(b) by 0 days.

(21) Appl. No.: 10/652,929

(22) Filed: Sep. 2, 2003

(65) Prior Publication Data
US 2005/0049773 A1   Mar. 3, 2005

(51) Int. Cl.
*B60T 7/20* (2006.01)
*B62D 13/00* (2006.01)

(52) U.S. Cl. .............. 701/70; 701/38; 701/72; 701/78; 280/5.502; 280/400; 280/442; 303/123

(58) Field of Classification Search .......... 701/70, 701/38, 71, 72, 75, 78, 80, 82, 83, 91; 280/5.502, 280/5.506, 5.507, 400, 409, 411, 422, 426, 280/432, 442, 472; 303/123, 125
See application file for complete search history.

(56) References Cited

U.S. PATENT DOCUMENTS

| | | | | |
|---|---|---|---|---|
| 4,232,910 A | * | 11/1980 | Snyder | 303/123 |
| 4,543,984 A | * | 10/1985 | Murray | 137/385 |
| 4,700,966 A | * | 10/1987 | Hawkins et al. | 280/432 |
| 4,787,683 A | * | 11/1988 | Singleton | 303/127 |
| 6,494,476 B2 | * | 12/2002 | Masters et al. | 280/426 |

* cited by examiner

*Primary Examiner*—Tan Q. Nguyen

(57) ABSTRACT

A ride control system for insuring safe operation of articulated vehicles by monitoring, detecting and suppressing erratic jackknifing, comprises a mechanism for monitoring among several inputs the driver's intentions, road conditions, the vehicle behavior, a microprocessor, and a means for commanding an anti-lock brake system to apply brakes on selected trailer wheels to suppress erratic jackknifing and restore vehicle stability. The microprocessor is used primarily for computing the probability of trailer and tractor roll-over due in part to erratic jackknifing when the vehicle is expected to move straight ahead. The probability of roll-over is converted to a time varying voltage signal for use by an electronic control module to proportionally apply brakes to those wheels whose angular velocity is greater than the average in order to drag the trailer on the side until erratic jackknifing is suppressed.

8 Claims, 3 Drawing Sheets

RIDE CONTROL SYSTEM FOR ARTICULATED VEHICLES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not applicable

BACKGROUND OF THE INVENTION

This invention applies to articulated vehicles such as semi-trucks, railroad cars and other vehicles where different sections of the vehicle are attached to one another by means of an articulated linkage of the type of a hitch assembly, and the invention relates to a Ride Control System (RCS) for restoring stability to the trailed part(s) of the vehicle when unwanted erratic jackknifing occurs at cruising speed. Throughout the following description of the invention, an on-highway semi truck will be referred to as a typical application for RCS.

A semi truck is commonly configured in such a way that when the vehicle makes a turn, its trailer(s) must pivot around the hitch assembly that connects the trailer to the tractor in order for the vehicle, as a whole, to complete the turn. The trailer behavior, and in particular the angle that it forms with its tractor vehicle, is referred to as jackknifing. Jackknifing is inherent of the mechanical configuration that allows the trailer to be attached to the tractor in a less rigid way. Under some driving conditions where the vehicle is moving straight ahead and the driver is not engaged in a steering maneuver, erratic jackknifing can occur and cause the trailer to wander laterally with respect to the vehicle. If this type of vacillating movement persists long enough and achieves a critical frequency, the trailer could be thrown off the hitch assembly and roll over. The damage caused by a rolled over trailer can be significant and cost lives.

Being able to detect and to counteract such erratic jackknifing is a difficult skill to acquire for an average truck driver. In this invention an electronically controlled and mechanically operated RCS is presented to assist the drivers of semi-trucks (the preferred application) and other articulated vehicles by providing means for detecting and counteracting unwanted erratic jackknifing. The system continuously monitors several inputs, including the driver's intention, the road conditions, and the trailer position. It is the combination of these inputs that allows the RCS to determine the probability of a roll-over due to erratic jackknifing. In the event of high probability of a roll-over the system would apply brakes to selected trailer wheels in such a way that the trailer can be dragged on one side or another and be forced to line up with the tractor truck.

BRIEF SUMMARY OF THE INVENTION

This invention is directed to RCS as a method and a structure for detecting and counteracting unwanted erratic jackknifing. The essential components of the system include several input ports for receiving signals from sensors such as a steering wheel sensor, wheel speed sensors, a trailer angle sensor, a suspension sensor, a central processing unit for evaluating the probability of trailer roll-over, and at least one output port for remotely applying brakes to selected wheels on the trailer.

There are several objects and advantages of this invention, including:

Enhanced operation of on-highway semi-trucks, off-highway articulated trucks commonly found on the mining and construction sites, and other trailed vehicles;
Enhanced safety for drivers of the above vehicles;
Enhanced safety for other drivers in the vicinity of the above vehicles.

DETAILED DESCRIPTION OF THE INVENTION

Figure 1:
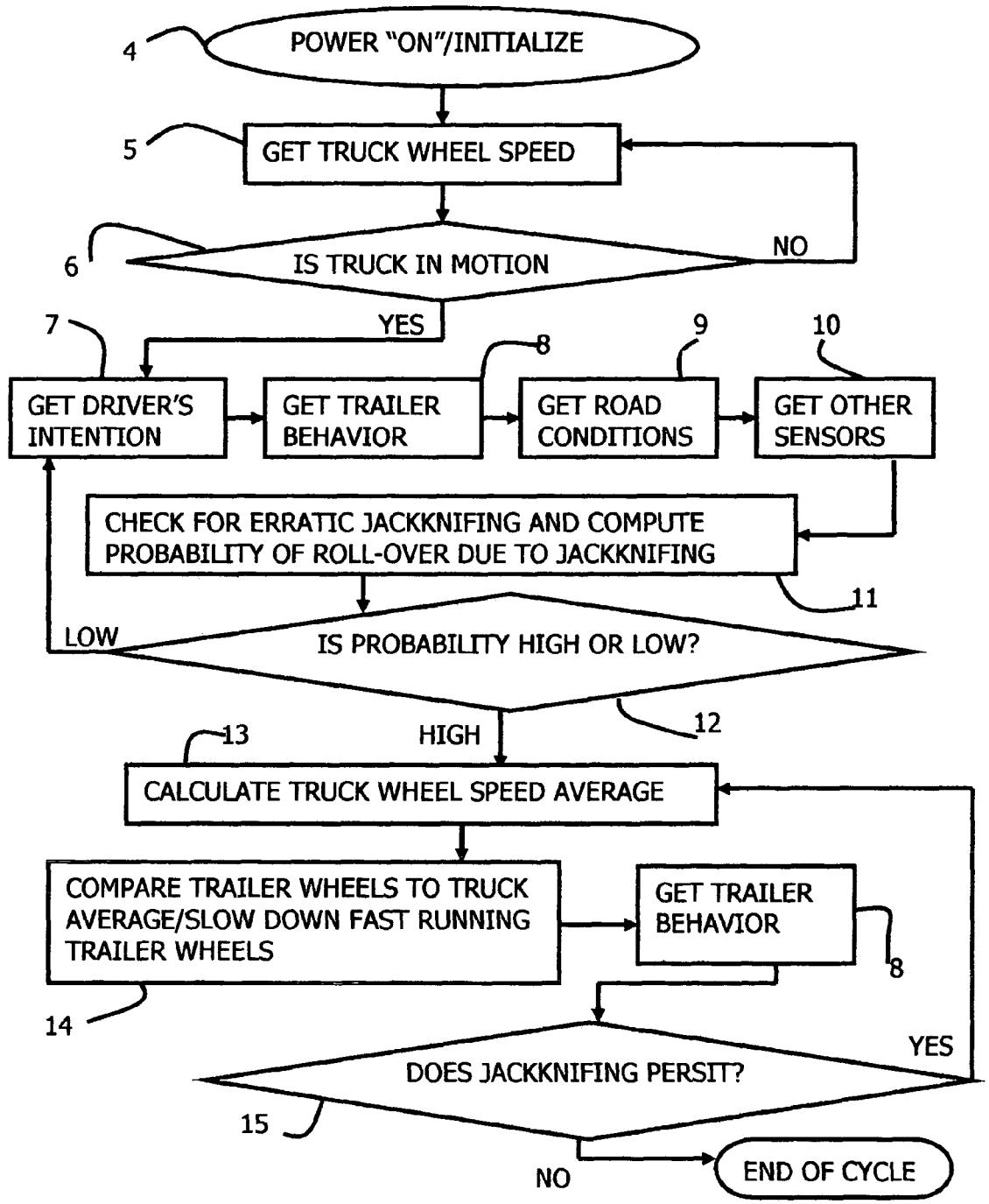
FIG. 1 shows a flow chart that illustrates how RCS functions in general as a method and as a structure.

In FIG. 1, reference numeral 4 designates a power supply to the system and an initialization step. It is during this step that RCS resets all input and output ports to their initial values by default. Reference numeral 5 designates truck wheel sensors which provide inputs to the system to determine whether or not the truck is in motion. As indicated by reference numeral 6, if the truck is not in motion the system goes back to the previous step where it waits for signals from the wheel sensors. If, however, the truck is in motion, RCS proceeds to acquiring inputs from the steering wheel sensor, designated by reference numeral 7 as the driver's intention; from the trailer position sensor, designated by reference numeral 8 as trailer behavior; from the suspension sensor, designated by reference numeral 9 as road conditions; and from other sensors as designated by reference numeral 10. Reference numeral 7 allows the system to determine whether the truck is making a turn or not. If the truck is making a turn then jackknifing should be expected between the tractor and the trailer, and the system should not counteract this kind of jackknifing since it is desirable for maneuvering the truck as a whole. Reference numeral 8 designates a position sensor that allows the system to determine whether or not the trailer is lined up with the tractor truck. The input from the position sensor is first used in conjunction with other sensors to detect erratic jackknifing, which leads to several RCS commands directed to suppressing the jackknifing. At the end of these commands the position sensor is used again to determine whether the jackknifing has been successfully suppressed. This constitutes an internal feedback in the structure of RCS.

Reference numeral 9 designates suspension sensors that allow the system to determine the shape of the terrain and the conditions of the road based on the suspension response. Reference numeral 10 designates other sensors that the system may need for calculating the probability of an accident as designated by reference numeral 11. Reference numeral 12 indicates that if the probability of a roll-over due to erratic jackknifing is low, the system returns to collecting new data from sensors to watch for erratic jackknifing. If on the other hand the probability of a roll-over is high, the system calculates the speed average based on the truck wheel sensor inputs as indicated by reference numeral 13, and proceeds to determining which trailer wheel is spinning faster than the truck speed average. Reference numeral 14 also indicates a set of commands by RCS directed to slowing down over spinning trailer wheels by applying remotely brakes on them. This is because when the trailer swings in one direction, it moves around in a circle in such a way that those wheels that are on the outer diameter of the circle have a greater angular velocity than those wheels on the inner diameter. Because of this behavior slowing down faster wheels results in dragging the trailer on the side of these wheels. The dragging can be done alternatively between the right and the left sides until the position sensor indicates that the trailer is lined up with the tractor. Reference numeral 15 indicates that, based on new inputs from the trailer position sensor (reference numeral 8) the system must always verify whether or not jackknifing still exists after brakes have been applied to selected wheels. This prevents the system for applying brakes for a period of time longer than it is needed.

Figure 2:
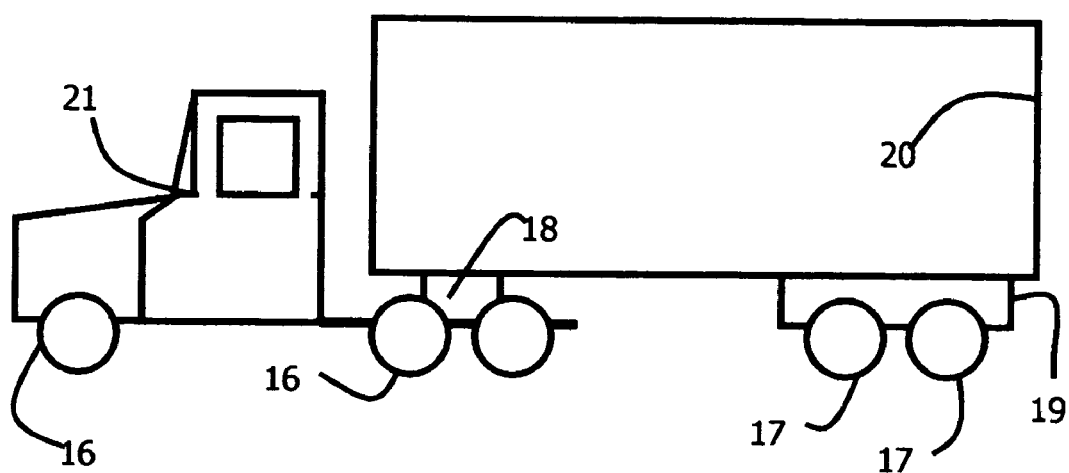
FIG. 2 shows preferred locations of the main components of RCS based on a semi-truck as a typical application.

In FIG. 2 Reference numeral 16 designates the tractor truck wheels where speed sensors are embedded. It is from the truck wheel speed that is calculated the speed average needed to compare with the trailer wheel speed for determining the direction in which the trailer is swinging when erratic jackknifing occurs. Reference numeral 17 designates the trailer wheels to which the system applies brakes one side at a time under erratic jackknifing. Reference numeral 18 designates a hitch assembly that attaches the trailer to the truck. In a preferred application and a preferred system configuration an angle sensor is located in the hitch assembly or its vicinity for providing the position of the trailer with respect to the truck. Reference numeral 19 designates the trailer suspension assembly which also is combined with mechanical parts of the anti-lock brake system. When erratic jackknifing is detected, the anti-lock brake system is activated by RCS to slow down fast moving wheels and bring the trailer in line with the truck. Reference numeral 20 designates the trailer, and reference numeral 21 designates the tractor truck. It is on the truck that the RCS central processor unit is located along with other sensors that provide inputs to the system.

Figure 3:
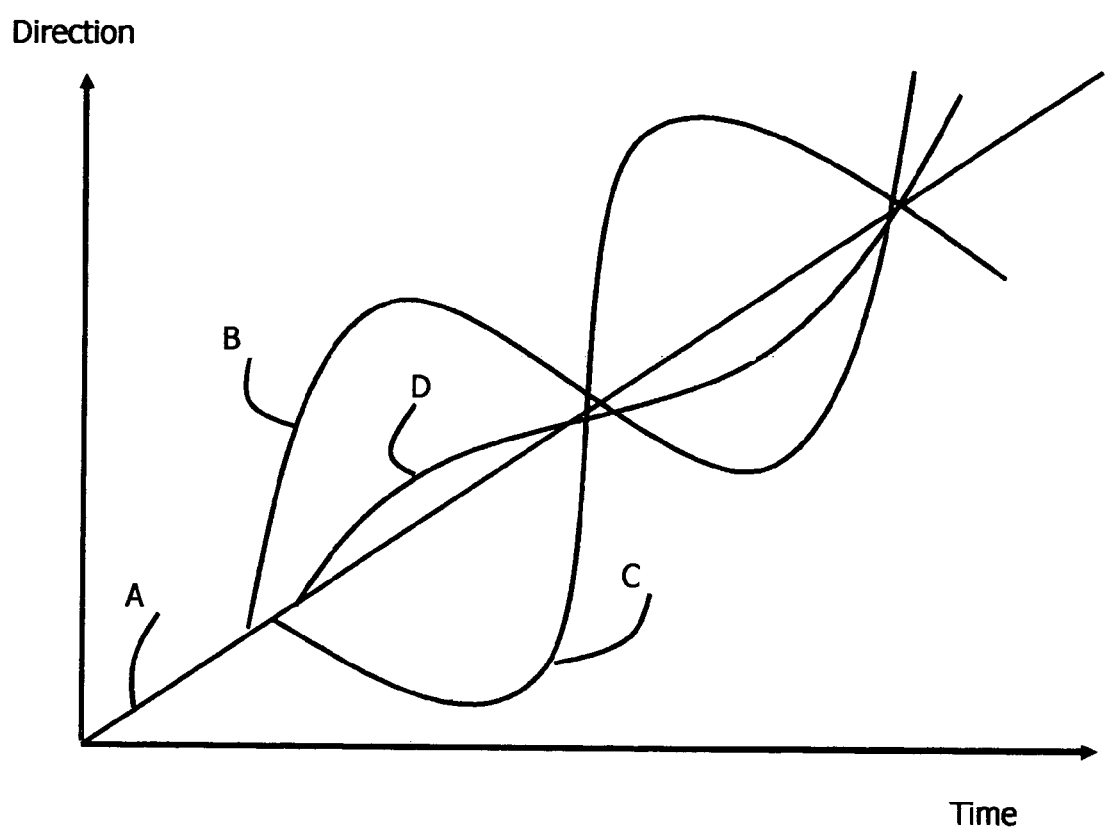
FIG. 3 shows a hypothetical scenario of RCS response and its effectiveness on erratic jackknifing in an articulated vehicle.

In FIG. 3 the line A indicates the path followed by the truck as a function of time. Under normal conditions the path followed by the trailer would also be that of the truck. If however erratic jackknifing occurs, then depending on the magnitude of the forces acting on the trailer to cause erratic jackknifing, the path followed by the trailer would be that indicated by the curve B. When erratic jackknifing is detected, the RCS will activate brakes on the trailer using the trailer anti-lock brake system. In this case brakes are applied on one side of the trailer at the time depending on the orientation of the trailer. If for instance the trailer is swinging to the left, brakes will be applied to the right side where drag is needed in order to force the trailer to line up with the truck. Subsequently if the trailer is swinging to the right, brakes will be applied to the left side for the same reason as explained above. The curve C designates the theoretical path that the RCS would impose to the trailer depending on the magnitude and the orientation of erratic jackknifing forces. The curve D designates the actual path taken by the trailer as a result of erratic jackknifing being suppressed by the ride control system. It can be seen that the curves B and C are similar in shape but not equal. This can be explained by the fact that on the one hand the trailer momentum is in part the result of the initial erratic jackknifing momentum, and on the other hand the actual trailer path is imposed by the ride control system to be closer to the truck path than it would be without the control system.

Having described the invention in detail, it will be appreciated by those skilled in the art that numerous modifications and changes may be made without departing from the spirit and basic concept of the invention. It is, therefore, not intended that the breadth of the invention be limited to the specific embodiment illustrated and described. Rather, it is intended that the scope of the present invention be determined by the appended claims.

We claim:

1. A method that applies to vehicles herein designated as articulated vehicles for continuously monitoring erratic jackknifing, continuously calculating the probability of a roll over of said articulated vehicle due to said erratic jackknifing using any computational technique, and continuously suppressing said erratic jackknifing to prevent said roll over using in part but not exclusively the driver's intention, the road conditions, the said articulated vehicle behavior, and other inputs in a ride control system capable of commanding the brake system among other functions, said articulated vehicle including at least one powered unit located at the front of the said articulated vehicle to provide the power to move the said articulated vehicle and to provide room for the driver, said powered unit is herein designated as tractor, and said articulated vehicle also including at least one trailed unit located at the back of the said articulated vehicle, herein designated as trailer, said trailer including at least one independent antilock brake system that can be operated independently of the said tractor to slow down or to stop the said trailer, said method for monitoring erratic jackknifing, calculating the probability of a roll over of said articulated vehicle and suppressing said erratic jackknifing to prevent said roll over comprising the steps of:
    a) providing the said ride control system with at least the driver's intention, the road conditions, the said articulated vehicle behavior and other inputs when the said articulated vehicle is in motion to determine whether or not erratic jackknifing is underway and determine the instantaneous orientation of the said trailer with respect to the said tractor,
    b) using any preferred method of computation to determine the probability of said trailer roll-over based in part but not exclusively on the magnitude of said erratic jackknifing,
    c) using any method to slow down the left or right wheels of the said trailer based on the said instantaneous orientation of the said trailer to drag the said trailer on the side and force it to line up with the said tractor.

2. A method as set forth in claim 1 wherein the step of taking the said driver's intention, the said road conditions, the said articulated vehicle behavior and the said other inputs further comprises the steps of:
    a) determining a sampling rate for receiving the said driver's intention, the said road conditions, the said articulated vehicle behavior and the said other inputs using any preferred method,
    b) translating the said driver's behavior, the said road conditions, the said articulated vehicle behavior and the said other inputs into recordable data using any preferred data format,
    c) using the said recordable data to determine the said probability of roll-over using a preferred method,
    d) using the said ride control system to activate brakes based in part but not solely on the said probability of roll over,
    e) determining a new said orientation of said trailer with respect to the said tractor to verify whether or not said erratic jackknifing has been suppressed.

3. A method as set forth in claim 1 wherein the step of calculating the said probability of roll over of said trailer due to said erratic jackknifing further comprises the steps of:
   a) conditioning said recordable data in order to achieve a desirable accuracy of calculation,
   b) determining a threshold level to distinguish between low and high probability and determine eminence of said roll over based on a preferred time interval.

4. A method as set forth in claim 1 wherein the step of applying brakes to left or right wheels of said trailer further comprises the steps of:
   a) converting said probability of roll over into a transmittable signal when said probability is high,
   b) transmitting said transmittable signal to said antilock brake system using a preferred communication mode,
   c) commanding said antilock brake system to deliver a certain amount of brake pressure to either left or right wheels of said trailer based in part on said transmittable signal.

5. A structure that applies to vehicles herein designated as articulated vehicles for continuously monitoring erratic jackknifing, continuously calculating the probability of a roll over of said articulated vehicle due to said erratic jackknifing using any computational technique, and continuously suppressing said erratic jackknifing to prevent said roll over using in part but not exclusively the driver's intention, the road conditions, the said articulated vehicle behavior, and other inputs in a ride control system capable of commanding the brake system among other functions, said articulated vehicle including at least one powered unit located at the front of the said articulated vehicle to provide the power to move the said articulated vehicle and to provide room for the driver, said powered unit is herein designated as tractor, and said articulated vehicle also including at least one trailed unit located at the back of the said articulated vehicle, herein designated as trailer, said trailer including at least one independent antilock brake system that can be operated independently of the said tractor to slow down or to stop the said trailer, said structure for monitoring erratic jackknifing, calculating the probability of a roll over of said articulated vehicle and suppressing said erratic jackknifing to prevent said roll over comprising the steps of:
   a) means for providing the said ride control system with at least the driver's intention, the road conditions, the said articulated vehicle behavior and said other inputs when the said articulated vehicle is in motion to determine whether or not erratic jackknifing is underway and determine the instantaneous orientation of the said trailer with respect to the said tractor,
   b) means for using any preferred method of computation to determine the probability of said trailer roll-over based in part but not exclusively on the magnitude of said erratic jackknifing,
   c) means to slow down the left or right wheels of the said trailer based in part on the said probability of said trailer roll over and the said instantaneous orientation of the said trailer to drag the said trailer on the side and force it to line up with the said tractor.

6. A structure as set forth in claim 5 wherein means for providing the said ride control system with at least the said driver's intention, the said road conditions, the said articulated vehicle behavior and said other inputs further comprises respectively at least one device capable of sensing the displacement of the steering system, at least one device capable of sensing the suspension response to the changes of said road conditions, at least one device capable of sensing the instantaneous position and orientation of the said trailer with respect to the said tractor, and at least one device capable of sensing each of the said other inputs.

7. A structure as set forth in claim 5 wherein a device for calculating the probability of said trailer roll-over based in part but not exclusively on the magnitude of said erratic jackknifing is an electronic device, said electronic device further comprising:
   a) at least one threshold crossing detector for setting a required minimum value for said displacement of the steering system, for said suspension response to the changes of said road conditions, for said the instantaneous position and orientation of the said trailer with respect to the said tractor, and for each of the said other inputs,
   b) at least one conversion circuit for rescaling the said driver's intention, the said road conditions, the said articulated vehicle behavior and said other inputs to a preferred voltage range to produce voltage signals,
   c) at least one range divider for differentiating between a low range and a high range of said voltage signals,
   d) at least one gain circuit for specifying variable gain factors to amplify said voltage signals to a required level of said preferred range,
   e) a microprocessor for calculating said probability of trailer roll-over based in part but not exclusively on the magnitude of said erratic jackknifing,
   f) at least one output circuit that is capable of translating said probability of trailer roll-over into a transmittable signal, whereby said transmittable signal is sent to said anti-lock brake system unit using said preferred communication mode.

8. A structure as set forth in claim 5 wherein a means for slowing down the left or right wheels of the said trailer based in part on the said probability of said trailer roll over and the said instantaneous orientation of the said trailer further comprises an electronic control unit capable of receiving said transmittable signal and comparing it to a predetermined signal for calculating offset needed to command and control said anti-lock brake system in such a way that the operation of said articulated vehicle is made safe.

* * * * *